(12) United States Patent
Peters

(10) Patent No.: US 6,283,230 B1
(45) Date of Patent: Sep. 4, 2001

(54) METHOD AND APPARATUS FOR LATERAL WELL DRILLING UTILIZING A ROTATING NOZZLE

(76) Inventor: Jasper N. Peters, 3668 Lake La., Millstadt, IL (US) 62260-2117

( * ) Notice: Subject to any disclaimer, the term of this patent is extended or adjusted under 35 U.S.C. 154(b) by 0 days.

(21) Appl. No.: 09/260,393

(22) Filed: Mar. 1, 1999

(51) Int. Cl.⁷ ....................................................... E21B 7/18
(52) U.S. Cl. ............................ 175/67; 175/324; 175/424
(58) Field of Search ........................... 166/298, 50, 55.1; 175/67, 62, 71, 77, 78, 324, 424

(56) References Cited

U.S. PATENT DOCUMENTS

| | | |
|---|---|---|
| Re. 33,660 | 8/1991 | Jelsma . |
| 1,367,042 | 2/1921 | Granville . |
| 1,485,615 | 3/1924 | Jones . |
| 1,733,311 | 10/1929 | McNeill . |
| 2,065,436 | 12/1936 | Ervin . |
| 2,251,916 | 8/1941 | Cross . |
| 2,271,005 | 1/1942 | Grebe . |
| 2,345,816 | 4/1944 | Hays . |
| 3,670,831 | 6/1972 | Winter, Jr. et al. . |
| 3,838,736 | 10/1974 | Driver . |
| 3,840,079 | 10/1974 | Williamson . |
| 3,853,185 | 12/1974 | Dahl et al. . |
| 3,873,156 | 3/1975 | Jacoby . |
| 3,958,649 | 5/1976 | Bull et al. . |
| 4,083,417 * | 4/1978 | Arnold ................................. 175/393 |
| 4,168,752 | 9/1979 | Sabol . |
| 4,365,676 | 12/1982 | Boyadjieff et al. . |
| 4,368,786 | 1/1983 | Cousins . |
| 4,445,574 | 5/1984 | Vann . |
| 4,526,242 | 7/1985 | Mathieü et al. . |
| 4,527,639 | 7/1985 | Dickinson, III et al. . |
| 4,533,182 | 8/1985 | Richards . |
| 4,534,427 * | 8/1985 | Wang et al. ............................ 175/67 |
| 4,589,499 | 5/1986 | Behrens . |
| 4,601,353 | 7/1986 | Schuh et al. . |
| 4,640,362 | 2/1987 | Schellstede . |
| 4,763,734 | 8/1988 | Dickinson et al. . |
| 4,832,143 | 5/1989 | Kaalstad et al. . |
| 4,832,552 | 5/1989 | Skelly . |
| 4,836,611 | 6/1989 | El-Saie . |
| 4,848,486 | 7/1989 | Bodine . |
| 4,854,400 | 8/1989 | Simpson . |
| 4,856,600 * | 8/1989 | Baker et al. ............................ 175/26 |
| 4,890,681 | 1/1990 | Skelly . |
| 5,090,496 | 2/1992 | Walker . |
| 5,113,953 | 5/1992 | Noble . |
| 5,148,880 | 9/1992 | Lee et al. . |
| 5,165,491 | 11/1992 | Wilson . |
| 5,413,184 | 5/1995 | Landers . |
| 5,853,056 * | 12/1998 | Landers ................................. 175/424 |

* cited by examiner

Primary Examiner—David Bagnell
Assistant Examiner—Zakiya Walker
(74) Attorney, Agent, or Firm—Haverstock, Garrett & Roberts LLP

(57) ABSTRACT

Method and apparatus for drilling into earth strata surrounding a well casing utilizing a rotating fluid discharge nozzle and reduction of static head pressure in the well casing in conjunction with the drilling operation.

20 Claims, 11 Drawing Sheets

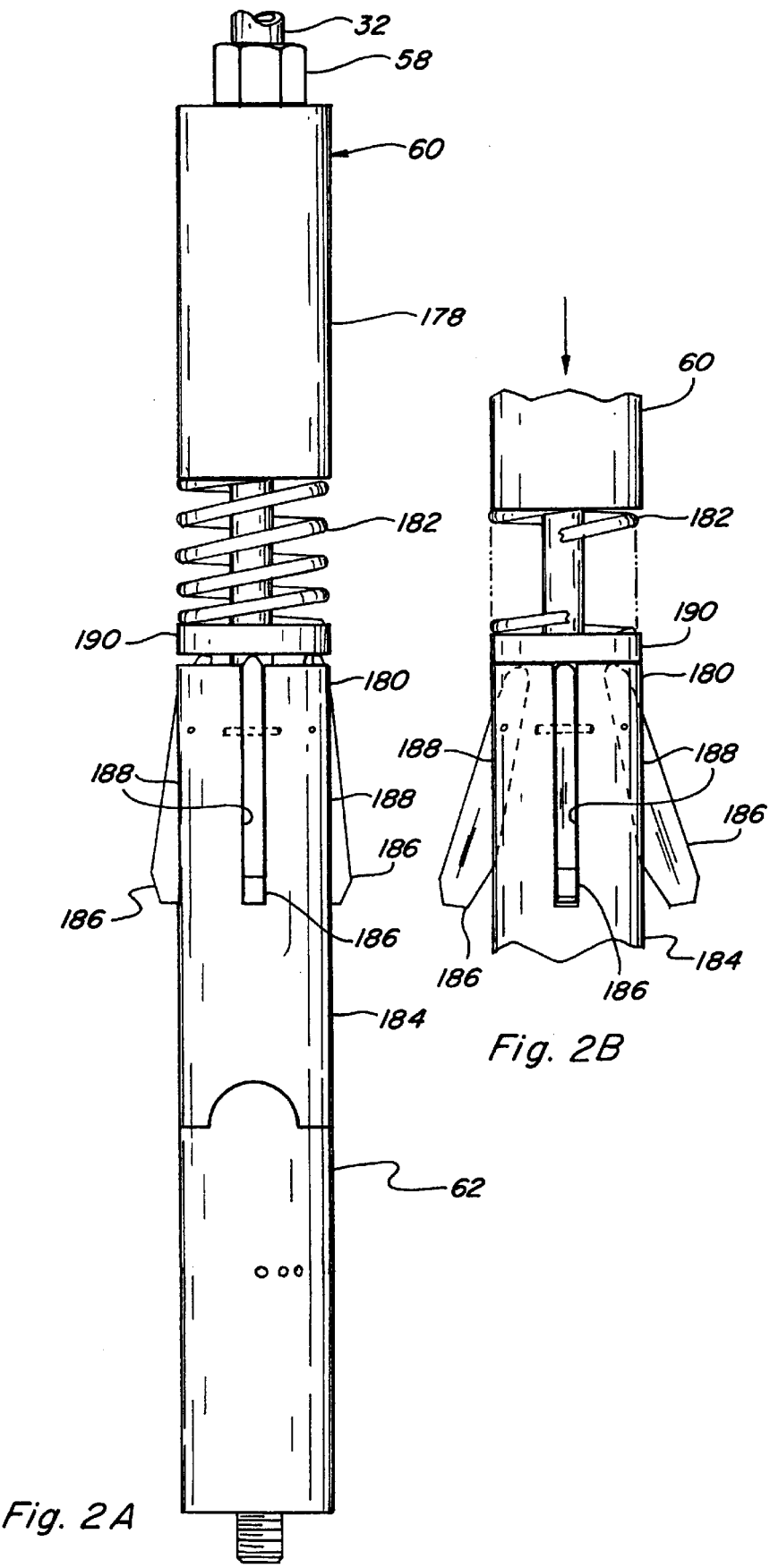

METHOD AND APPARATUS FOR LATERAL WELL DRILLING UTILIZING A ROTATING NOZZLE

TECHNICAL FIELD

This invention relates generally to methods and apparatus for penetrating a side of a well casing and drilling into earth strata surrounding the well casing, and more particularly, to an improved method and apparatus for drilling into the surrounding earth strata utilizing a rotating fluid discharge nozzle and reduction of static head pressure in the well casing in conjunction with the drilling operation.

BACKGROUND ART

A large number of wells have been drilled into earth strata for the extraction of oil, gas, and other material therefrom. In many cases, such wells are found to be initially unproductive, or decrease in productivity over time, even though it is believed that the surrounding strata still contains extractable oil, gas or other material. Such wells are typically vertically extending holes including a casing usually of mild steel pipe having an inner diameter of from just a few inches to about eight (8) inches in diameter for the transportation of the oil, gas or other material upwardly to the earth's surface.

In an attempt to obtain production from unproductive wells and increase production in under producing wells, methods and apparatus for cutting a hole in the well casing and forming a lateral passage therefrom into the surrounding earth strata are known. Reference for instance, Landers U.S. Pat. No. 5,413,184 issued May 9, 1995; and Schellsteed U.S. Pat. No. 4,640,362 issued Feb. 3, 1987, which disclose exemplary methods and apparatus for producing lateral holes in the earth's strata surrounding a well casing. However, such known methods and apparatus have not yet been known to provide satisfactory results. In particular, the known apparatus of Landers utilizes a non-rotating blasting type fluid nozzle wherein fluid under pressure is directed at the earth's strata has been found to be unable to produce a hole in the strata of more than a few inches in depth. This shortcoming is believed to be due largely to the inability of the non-rotating blaster type nozzles to form a passage in the strata sufficiently unobstructed to allow advancement of the nozzle into the strata, particularly in strata having suitable porosity and permeability characteristics for oil, gas and/or other commercial products. Also, it has been found that any formation that a well is located in will produce a given hydrostatic head in the well which is equal to the formation pressure. This is problematic because the formation has a capability of absorbing fluid around the nozzle, including immediately ahead of and shortly behind the nozzle, when the hydrostatic head becomes greater than the formation pressure, resulting in at least partial and in many cases total stoppage of movement of cuttings away from the nozzle.

Accordingly, the present invention is directed to overcoming one or more of the problems as set forth above.

DISCLOSURE OF THE INVENTION

According to one aspect of the present invention, a method for penetrating a well casing and surrounding earth strata at a desired elevation within a well is disclosed, the method including the steps of:

a) forming a hole through said well casing at the desired elevation;

b) inserting a flexible tube having a nozzle on an end thereof into said hole; and c) pumping a fluid into the flexible tube and out through the nozzle while rotating said nozzle for drilling an extension of said hole into said earth strata.

According to another aspect of the present invention, apparatus adapted for drilling into strata surrounding a well casing through an existing hole in a side of the well casing is disclosed. The apparatus includes:

a flexible tube adapted for passage through the hole having a first end, an opposite second end, and an internal cavity extending therethrough between the first end and the second end;

a nozzle adapted for passage through the hole in the side of the well casing mounted to the first end of the flexible tube, the nozzle having at least one aperture therethrough in communication with the internal cavity of the flexible tube;

structure attached to the second end of the tube for supporting the tube in the well casing;

structure for rotating at least the nozzle; and structure for communicating fluid under pressure to the second end of the flexible tube for passage through the tube and discharge through the nozzle during the rotation thereof.

BRIEF DESCRIPTION OF DRAWINGS

FIG. 2A is an fragmentary enlarged fragmentary side view of the apparatus of FIG. 1;

FIG. 2B is another enlarged fragmentary side view of the apparatus of FIG. 1;

BEST MODE FOR CARRYING OUT THE INVENTION

Figure 1:
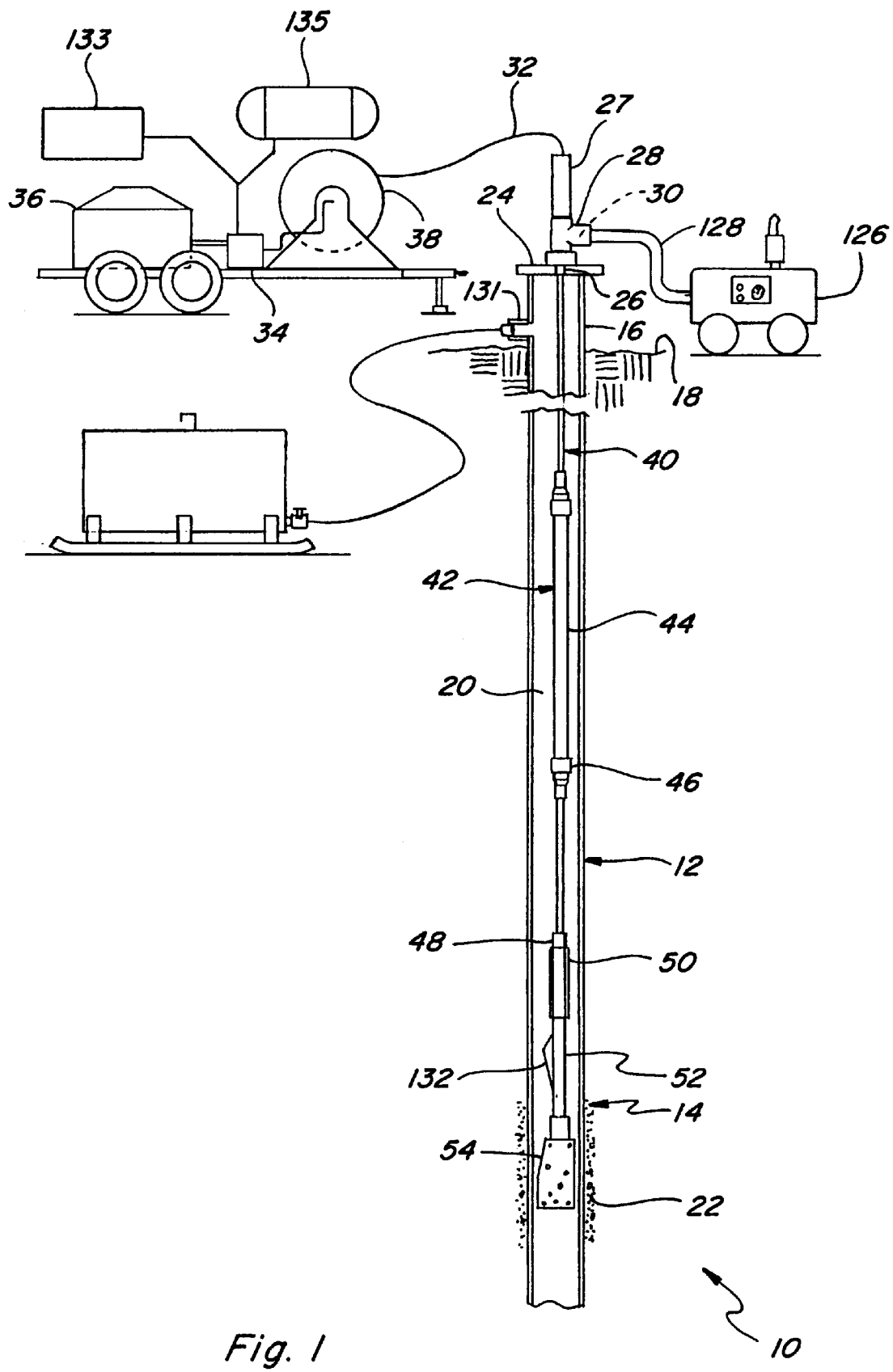
FIG. 1 is a side elevational view showing a well in fragmentary cross section and apparatus according to the present invention therein in position for penetrating the well casing thereof.
Figure 2:
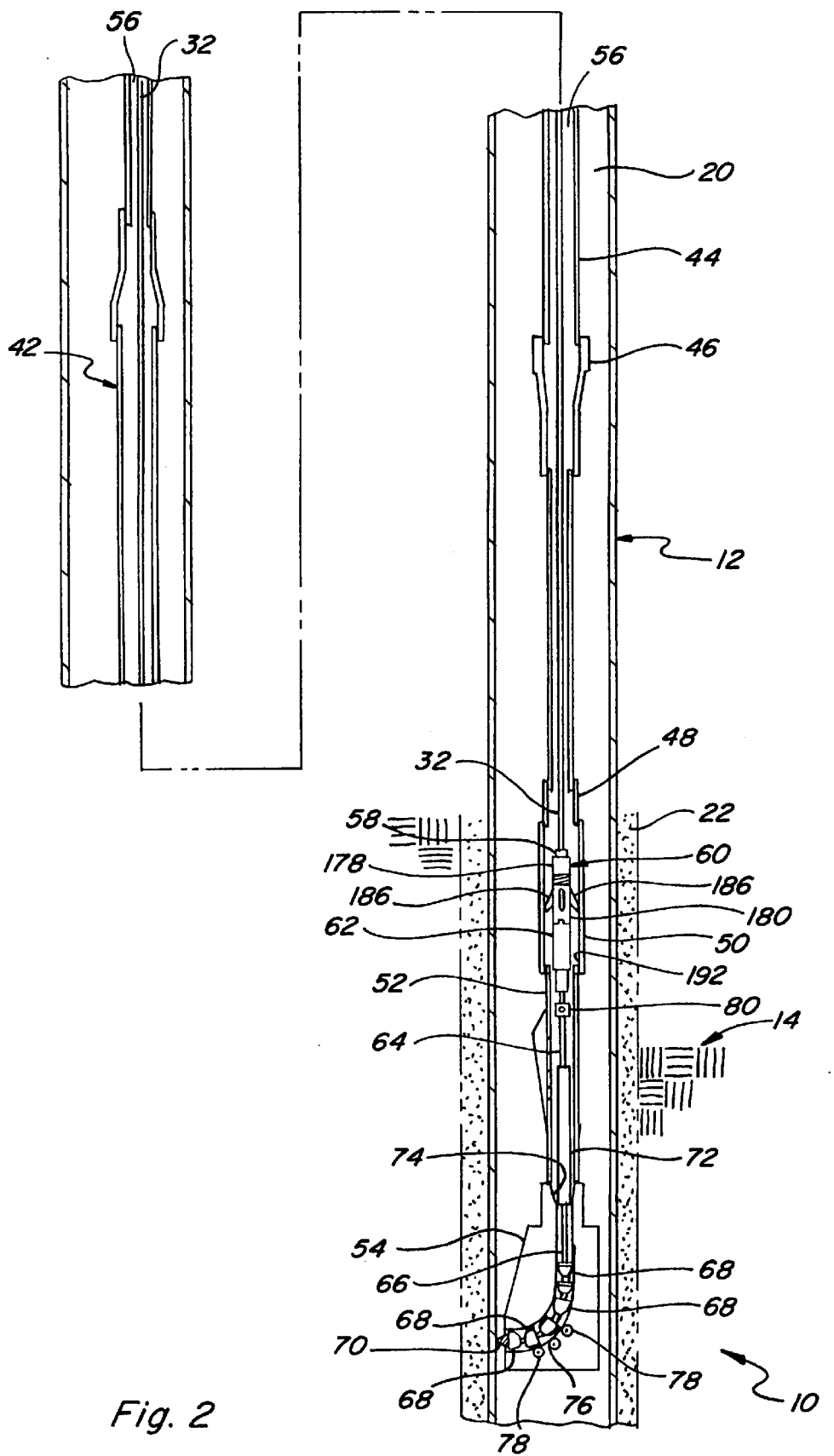
FIG. 2 is a side elevational view of the well and apparatus of FIG. 1 in partial cross-section showing the apparatus being used to form a hole through the casing.

FIGS. 1 and 2 show apparatus 10 constructed and operable according to the present invention for penetrating a well casing 12 and surrounding earth strata 14. Well casing 12 consists of steel piping extending from a well head 16 on or near the earth's surface 18 downwardly through strata 14 into a formation therein which hopefully contains oil and/or gas. Well casing 12 is of conventional construction defining an interior passage 20 of from between about 4 to about 8 inches in diameter and from several hundred to several thousand feet in depth. Cement or other material 22 is typically located around well casing 12 to hold it in place and prevent leakage from the well. Well head 16 includes a cap 24 having an opening 26 therethrough communicating passage 20 with a conventional oil saver device 27, and a tee 28 including an access port 30.

Apparatus 10 includes a quantity of flexible tubing 32 adapted for holding fluid under pressure sufficient for drilling the formation. For instance, pressure of as high as about 10,000 psi have been used for wells at depths of about 2000 feet from the surface, and higher pressures such as about 15,000 psi can be used for drilling at greater depths. The fluid under pressure is supplied by a pump 34 connected to a fluid source 36 such as a city water supply, a water tank or the like. Flexible tubing 32 is stored on a reel 38 from which the tubing is fed into a length of more rigid tubing 40 which extends a desired distance down through interior passage 20 of casing 12 to a desired elevation below the earth's surface. Tubing 40 terminates in passage 20 of casing 12 at a coupling with a down hole unit 42 suspended in passage 20 by tubing 40. Down hole unit 42 includes a tubular motor housing 44, an upper receiving tube 46 and a kick-off shoe unit 48. Kick-off shoe unit 48 includes a tubular casing drill receiving unit 50, an air jet tube 52 and a bottom-most kick-off shoe 54. Tubing 40 and down hole unit 42, including motor housing 44, upper receiving tube 46, and all of the above discussed components of kick-off shoe unit 48 remain in the position shown down hole in casing 12 throughout operation of apparatus 10.

Flexible tubing 32 extends through a cavity 56 extending through tubing 40 and down hole unit 42, and terminates at a coupler 58 shown supporting a casing drill unit 60 in FIG. 2. Casing drill unit 60 includes a fluid driven motor 62 connected in fluid communication with flexible tubing 32. Motor 62 is constructed essentially as shown in FIG. 2A, and is connected to an output shaft 64 operatively rotatable thereby and including a terminal end 66 supporting a plurality of universal joints 68 for rotation therewith, including an end most universal joint 68 having a conical shaped casing cutter 70 mounted thereto for rotation therewith. A protective sheath 72 is also mounted about output shaft 64 and defines an inner cavity (not shown) for containing and protecting universal joints 68 and casing cutter 70 as those members are lowered through cavity 56 of tubing 40 and down hole unit 42. As casing drill unit 60 is lowered through cavity 56, sheath 72 will come into abutting relation with a beveled edge 74 within kick-off shoe 54 thus stopping downward travel of the sheath, while casing cutter 70 and universal joints 68 will proceed into shoe 54, travel around an elbow 76 therein, such that casing cutter 70 will come as shown to rest against the inner surface of casing 12. In this regard, shoe 54 includes a plurality of rollers 78 to facilitate travel of cutter 70 and universal joints 68 through elbow 76, and output shaft 64 includes a swivel 80 for alignment purposes.

Also referring to FIGS. 2A and 2B, casing drill unit 60 additionally includes an upper portion 178 connected to flexible tubing 32 via coupler 58, and a spring loaded dog assembly 180 disposed between upper portion 178 and motor 62. Dog assembly 180 includes a compression coil spring 182 disposed between upper portion 178 and a dog housing 184 including a plurality of dogs 186 pivotally mounted in slots 188 at angularly spaced locations around housing 184. Dogs 186 are maintained in engagement with a spring retainer 190 by spring 182 in a retracted position (FIG. 2A) and are moveable in opposition to the spring to a radially extended position (FIG. 2B) when sheath 72 forcibly contacts beveled edge 74 of kick-off shoe 54 (FIG. 2). When radially extended, dogs 186 engage a splined inner circumferential surface 192 of casing drill receiving unit 50 for preventing rotating of casing drill unit 60 therein. Then, after the casing drilling operation is completed as explained next, and casing drill unit 60 is withdrawn from receiving unit 50, dogs 186 retract to allow passage upwardly through the upper portion of down hole unit 42 and tubing 40.

Figure 3:
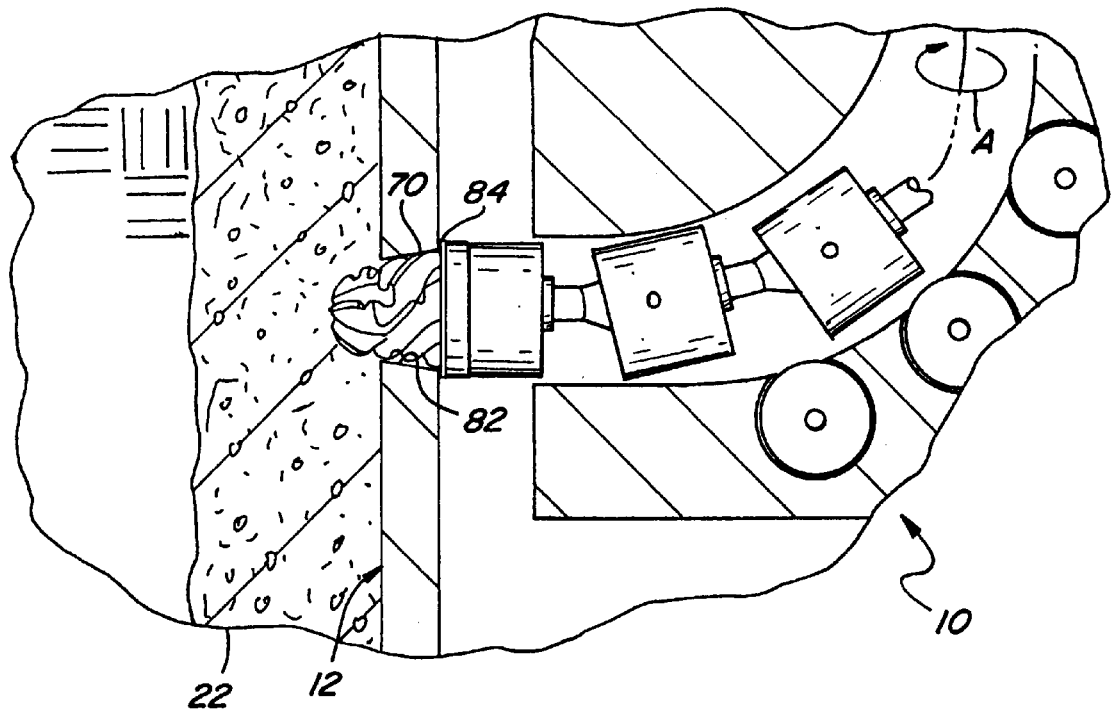
FIG. 3 is an enlarged fragmentary sectional view of the well and apparatus of FIG. 1 showing the completed hole through the casing.

Referring also to FIG. 3, rotation of casing cutter 70 of apparatus 10 as shown by arrow A, by motor 62 while urged against the inner surface of casing 12 results in casing cutter 70 cutting through casing 12, producing a hole 82. Importantly, an annular drill stop 84 extends around casing cutter 70 at a predetermined location spaced from the tip thereof to prevent casing cutter 70 from cutting substantially past casing 12 into cement 22. Upon formation of hole 82, operation with casing drill unit 60 is complete, and that unit can be withdrawn from down hole unit 42 and tubing 40.

Figure 3A:
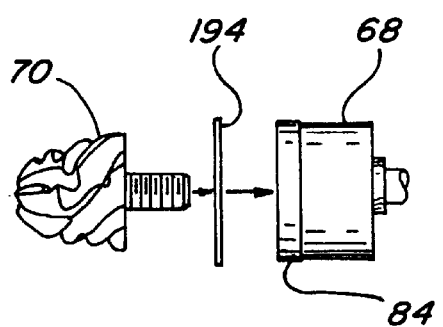
FIG. 3A is an exploded side view of a cutter of the apparatus of FIG. 1.

Referring to FIG. 3A, a consumable shim 194 is disposed between cutter 70 and drill stop 84 which is mounted to endmost universal joint 68. Shim 194 is damaged by rotating contact with the inner surface of casing 12 and importantly can be inspected after withdrawal of unit 60 from casing 12 for verify that hole 82 has been properly formed.

Figure 4:
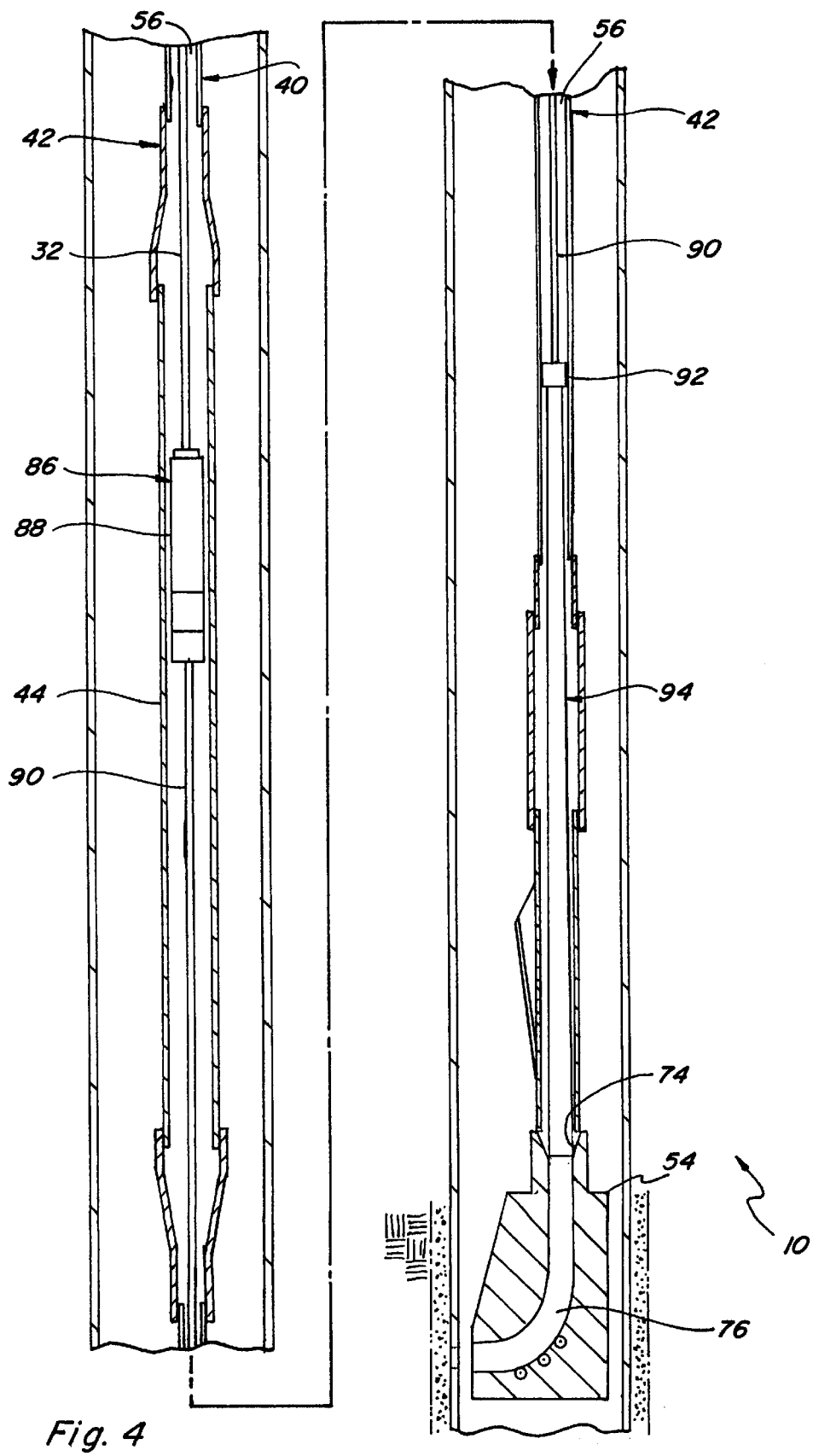
FIG. 4 is a fragmentary side elevational view in section showing apparatus according to the present invention for drilling strata surrounding the well casing.

Referring to FIG. 4, after withdrawal of casing drill unit 60, a strata drill unit 86 of apparatus 10 is mounted to flexible tubing 32 and lowered through cavity 56 of tubing 40 and down hole unit 42 to kick-off shoe 54. Strata drill unit 86 includes a fluid driven motor 88 located in motor housing 44, motor housing 44 having an inside cross-sectional shape at least marginally larger than the outer cross-sectional shape of motor 88, as will be discussed. A rigid tube 90 is connected to motor 88 for rotation thereby. Rigid tube 90 terminates at an upper end 92 of a set down device 94.

Figures 5, 5A:
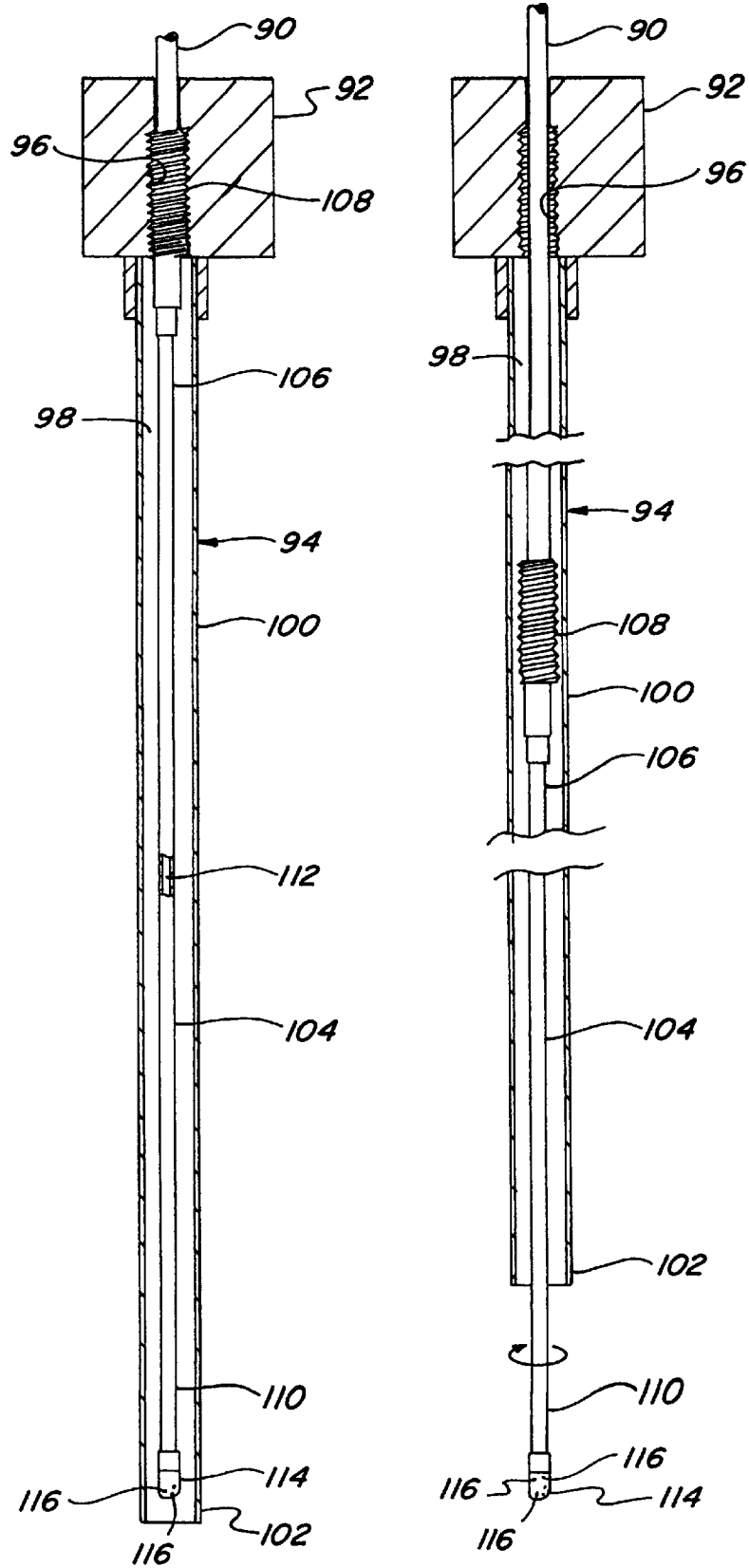
FIG. 5 is a fragmentary side view in partial cross-section of the apparatus of FIG. 4.
FIG. 5A is a fragmentary side view of the apparatus of FIG. 4 in an extended position.

Referring also to FIGS. 5 and 5A, set down device 94 includes a threaded passage 96 extending therethrough and communicating with an internal passage 98 of a rigid tubular sheath 100. Sheath 100 includes a bottom most terminal end 102 positionable in abutment with beveled edge 74 of kick-off shoe 54 for positioning internal passage 98 in communication with elbow 76 (FIG. 4). A flexible tube 104 has an upper end 106 mounted to rigid tube 90 for rotation therewith by an externally threaded coupler 108 adapted for threaded engagement with set down device 94 in threaded passage 96. When coupler 108 is threadedly engaged with set down device 94, flexible tube 104 is located and protected within internal passage 98 of sheath 100. Flexible tube 104 includes a lower end 110 opposite upper end 106, and an internal passage 112 therethrough connecting upper end 106 with lower end 110. A nozzle 114 is mounted to lower end 110 of tube 104 in fluid communication with internal passage 112. Nozzle 114 includes a plurality of apertures 116 therethrough.

Referring more particularly to FIGS. 4, 5 and 5A, motor 88 is operable to rotate rigid tube 90 to threadedly disengage coupler 108 from threaded passage 96 of set down device 94 to allow nozzle 114 and lower end 110 of flexible tube 104 to drop beneath sheath 100, for entering elbow 76 of shoe 54.

Figure 6:
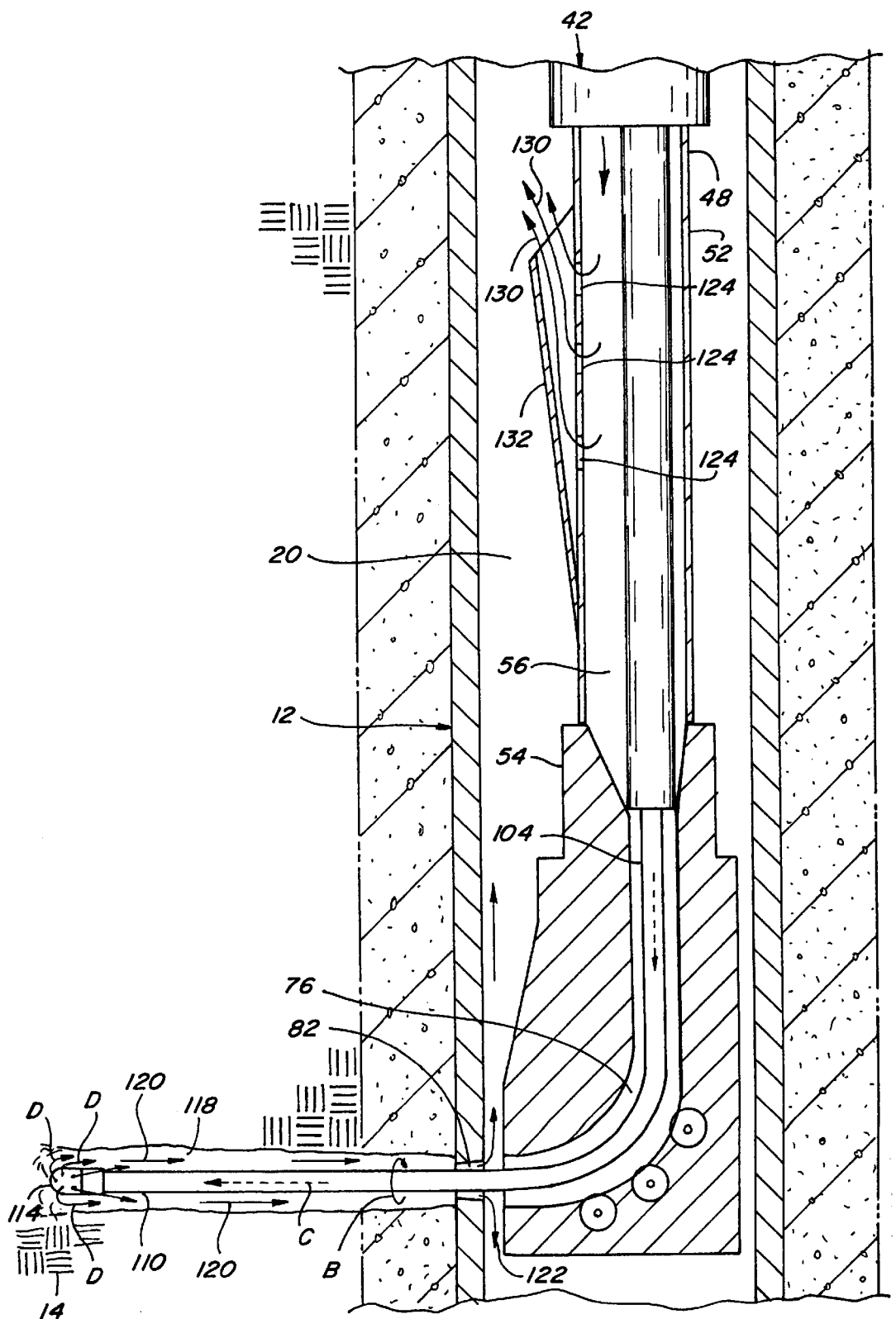
FIG. 6 is a fragmentary side elevational view of the apparatus of FIG. 4 drilling an extension of the hole of FIG. 2 into the strata and reducing a hydrostatic head over the hole.

Turning to FIG. 6 as flexible tube 104 is continually lowered, lower end 110 and nozzle 114 will pass through elbow 76 of shoe 54 and into hole 82 through casing 12, hole 82 having a slightly tapered shape corresponding to the shape of casing cutter 70. As nozzle 114 advances through hole 82, it is rotated as denoted by the arrow B by motor 88 (FIG. 4) and fluid from fluid source 36 is pressurized by pump 34 (FIG. 1) and communicated to nozzle 114 through motor 88, rigid tube 90 (FIG. 4), and flexible tube 104, as denoted by the arrow C. The fluid under pressure is discharged from nozzle 114 through apertures 116 against cement and strata 14 lying beyond hole 82, as denoted by the arrows D. The fluid under pressure impinging the cement and/or strata 14, in combination with the rotation of nozzle 114, operates to loosen and dislodge particles to thereby drill an extension 118 of hole 82 into the cement and/or strata 14. Additionally, a fluid flow as shown by the arrows 120 is created by the discharged fluid for carrying the particles through extension 118 and hole 82 so as to be discharged into interior passage 20 of casing 12 as denoted by arrow 122.

During the strata drilling step, it has been found that if a hydrostatic head having a pressure greater than the formation pressure in extension 118 is present above the drilling location, for instance, resultant from the addition of water or liquid from the strata drilling operation to the column of liquid normally present in casing 12, liquid will be absorbed into the formation or strata around nozzle 114 and flexible tube 104, so as to stop the fluid and particle flow denoted by arrows 120. For instance, it has been found when attempting to drill an extension 118 at a depth of about 2500 feet below the earth's surface and with a hydrostatic head which has greater head pressure than the formation pressure, little to no drilling progress could be made, which is believed largely due to limitations on particle and fluid flow 120 caused by the hydrostatic head.

To mitigate the above discussed problems relating to a large hydrostatic head, air jet tube 52 has a plurality of air jets 124 communicating internal passage 56 extending through tubing 40 and down hole unit 42 with interior passage 20 of casing 12. Referring back to FIG. 1, a compressor 126 is located on surface 18 and includes a high pressure line 128 connected through access port 30 with internal passage 56. Compressor 126 is conventionally operable to compress air and direct the air through high pressure line 128 into internal passage 56 wherein the pressurized air travels downwardly to air jets 124 and is discharged into interior passage 20 as denoted by the arrows 130. Here, it should be noted that compressor 126, line 128, tubing 40 and the components of down hole unit 42 should be constructed so as to be sufficiently strong to withstand the pressures necessary for carrying air under pressure to the contemplated depth and discharging the air through air jets 124. An important purpose for discharging air under pressure into interior passage 20 is to use the air as a vehicle for transporting water and other liquids in interior passage 20 upwardly through the passage so as to be discharged through an access port 131 at the earth surface 18, or through some other convenient port at the surface, to effectively reduce any hydrostatic head that may be present. Further in this regard, air jet tube 52 includes a venturi hood 132 over jets 124 designed for directing air discharged from the jets upwardly so as to provide a venturi like effect.

Here, it should be noted that periodically during the strata drilling step, air or gas under pressure can be injected into flexible tubing 32 so as to be discharged through apertures 116 of nozzle 114, for clearing any debris or blockage that may be present therein and for clearing accumulated debris from extension 118. A suitable pressure for the air or gas has been found to be about 2,000 psi or greater, and it can be injected by a high pressure compressor 133 or other suitable device connected to tubing 32 at pumps 34 as shown or at another suitable location. This is believed to be effective because with the reduction of the hydrostatic head in the well, when the air or gas under pressure exits apertures 116 the air or gas will expand and move at high velocity toward casing 12 to urge the cuttings from extension 118.

Figure 7:
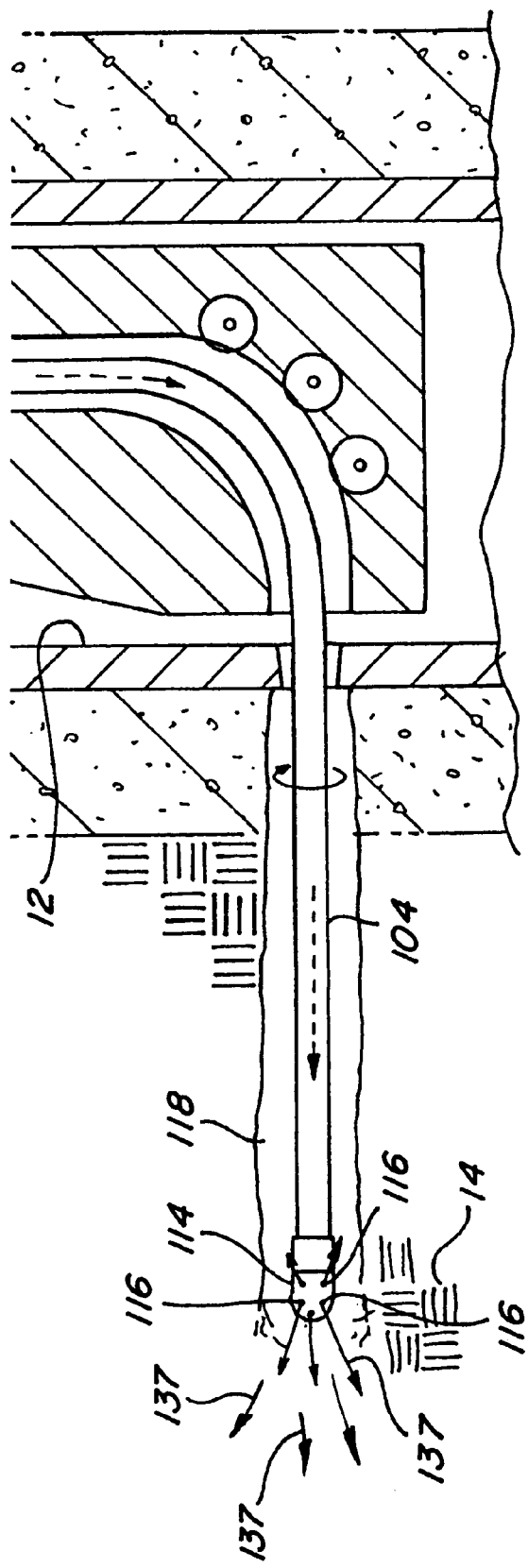
FIG. 7 is a fragmentary side elevational view of the apparatus of FIG. 4 showing an acid or a gas being injected into the extension of FIG. 6.

Referring to FIGS. 1 and 7, after extension 118 has been drilled to a desired extent, the delivery of air to air jets 124 can be stopped, to allow the hydrostatic head to again build up. Then, once the hydrostatic head is sufficiently high, an acid, mixture of acid and another substance, or a gas contained in a tank 135 on the earth's surface 18 can be injected into flexible tubing 32 under pressure supplied by compressor 133, pump 34 or another suitable device, so as to be conveyed through flexible tube 104 to nozzle 114 and discharged through apertures 116 thereof into strata 14 surrounding extension 118. This has been found to be an advantageous procedure, as the acid, mixture or gas is delivered in a pristine condition to the strata surrounding extension 118, for etching or otherwise reacting with alkaline materials in the strata, for increasing the production potential at that location. Here, the presence of the hydrostatic head has been found to provide a pressurized condition in well casing 12 which is sufficient to maintain the acid or gas localized within extension 118 where it is desired.

Figure 8:
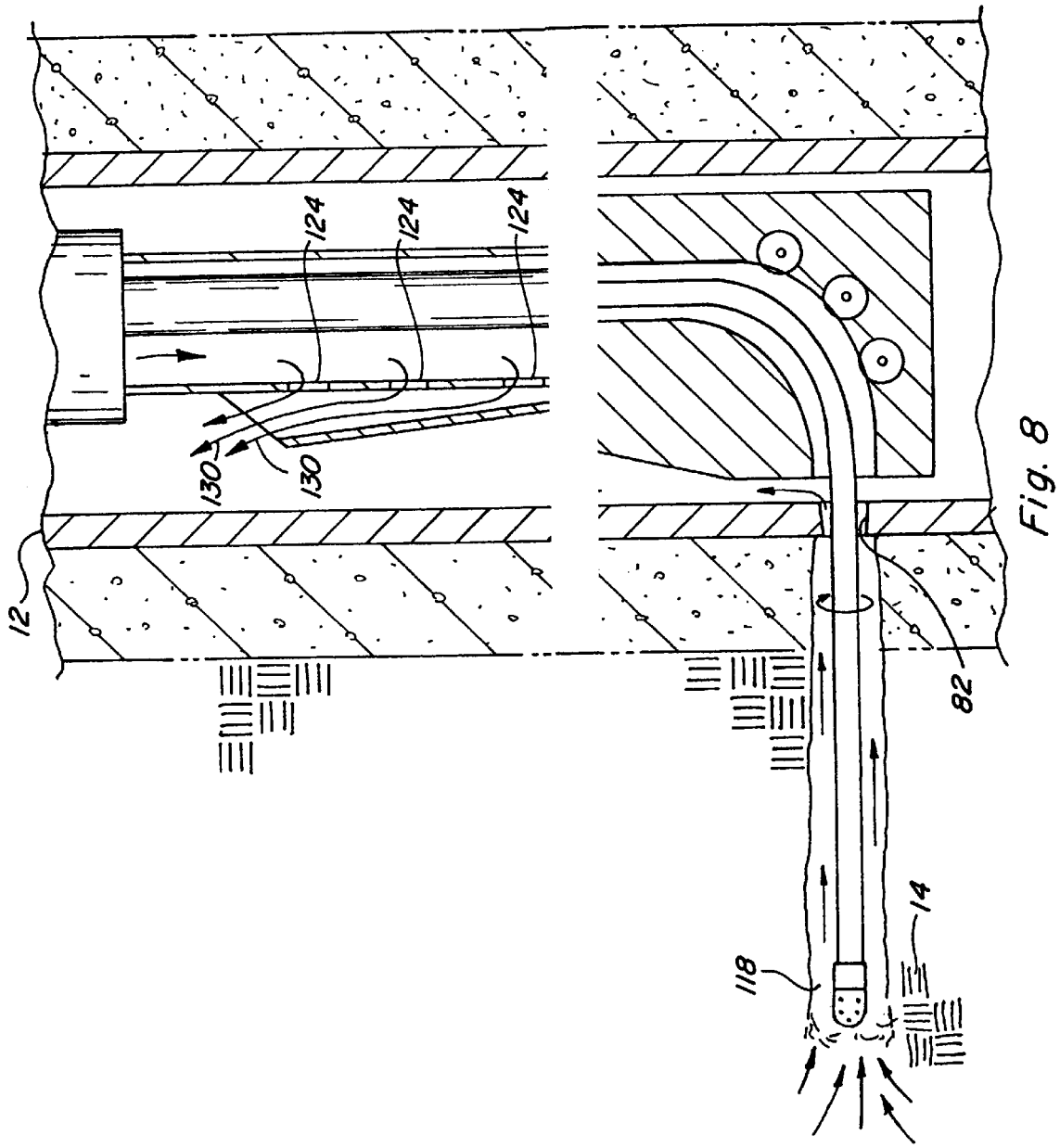
FIG. 8 is a fragmentary side elevational view of the apparatus of FIG. 4 showing flow of material from the extension during reduction of the hydrostatic head.

Referring also to FIG. 8, after a sufficient period of time for the acid or gas to perform its desired function has elapsed, the hydrostatic head can be reduced by pumping air through air jets 124 in the above-described manner as denoted by the arrows 130 to reduce the hydrostatic head, such that the acid, gas and/or reaction products can flow from the strata 14 in the vicinity of extension 118, through hole 82 and into casing 12, wherein those materials can be carried by the pressurized air to well head 16. At well head 16 the material can exit casing 12 through access port 131 and be collected in a suitable repository, such as the storage tank illustrated. There, the material can be examined to ascertain the success of the acid or gas injection to determine whether drilling and/or injection should be continued.

As noted above, it is important to rotate nozzle 114 during the strata drilling step such that extension 118 is of sufficient size and is unobstructed to allow the advancement of nozzle 114 and flexible tube 104 therethrough. Rotation of flexible tube 104 and nozzle 114 is preferably achieved using motor 88.

Figure 9:
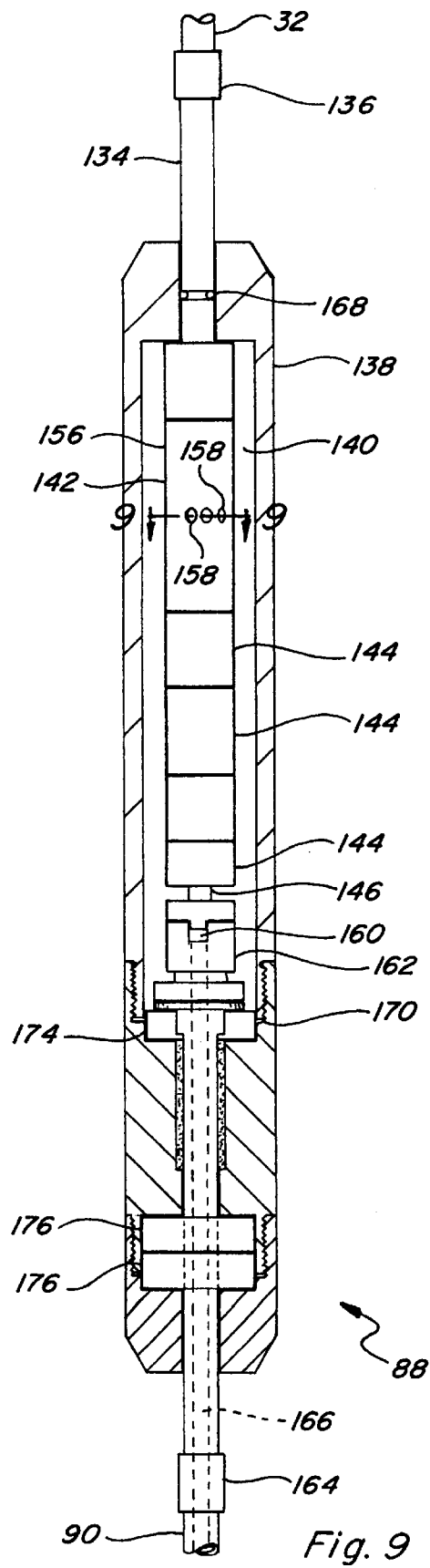
FIG. 9 is a side elevational view of the apparatus of FIG. 4 in partial cross-section; and, FIG. 9A is a cross-sectional view taken along line 9—9 of FIG. 9.
Figure 9A:
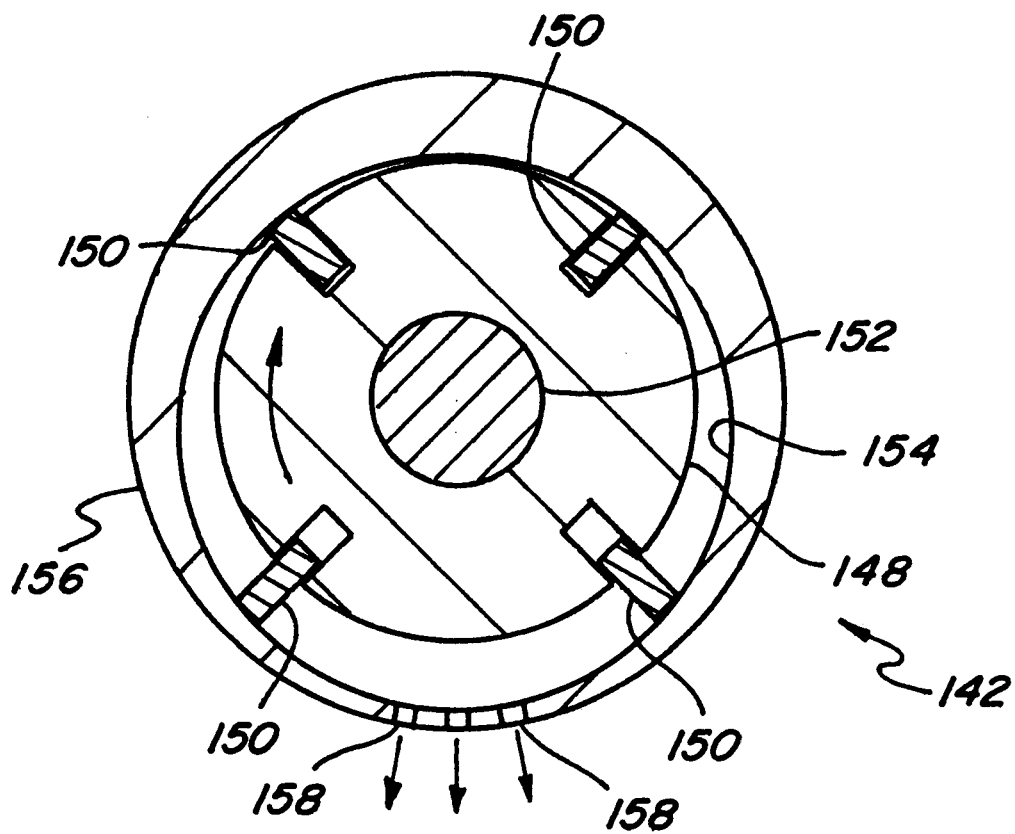

Turning to FIG. 9, motor 88 is shown. Motor 88 includes an inlet nipple 134 coupled in fluid communication with tubing 32 by a coupler 136 for receiving pressurized fluid from pump 34 therethrough. Coupler 136 also supports motor 88, rigid tube 90, flexible tube 104 and nozzle 114. Motor 88 includes an outer case 138 defining an internal cavity 140 containing a fluid motor unit 142 connected in driving relation to a plurality of gear reducers 144, including a final gear reducer having an output shaft 146 driven by fluid motor unit 142. Referring also to FIG. 9A, fluid motor unit 142 is a vane type fluid motor having an eccentric 148 including a plurality of radially moveable vanes 150 of solid brass, copper or other substantially rigid material. Motor 62 discussed above is constructed essentially the same. Motor unit 142 is connected in driving relation to a drive shaft 152 for relative eccentric rotation to an inner circumferential surface 154 of an inner case 156 under force of pressurized fluid received through inlet nipple 134. The fluid is then discharged from inner case 156 through discharge ports 158 into internal cavity 140 wherein the pressurized fluid travels to an inlet port 160 of a hollow motor output shaft 162. Output shaft 162 passes through outer case 138 and is coupled to rigid tube 90 by a coupler 164. Output shaft 162 includes an internal passage 166 thus connected in fluid communication with internal passage 112 through tube 90 and tube 104, for delivering the pressurized fluid to nozzle 114.

As noted above, the pressurized fluid carried through tubing 32 to motor 88 can be at a pressure of as high 10,000 psi or greater. To enable motor assembly 88 to withstand and contain such pressures without significant leaking, an O-ring 168 is located around inlet nipple 134, a second O-ring 170 extends around the juncture of two parts of outer case 138, and a series of O-rings or packing 172 extend around motor output shaft 162 as it passes through case 138. Additionally, a thrust bearing 174 and ball bearings 176 are provided in association with output shaft 162 for the smooth rotation of tubes 90 and 104, and nozzle 114.

Industrial Applicability

Other aspects, objects and advantages of the present invention can be obtained from a study of the drawings, the disclosure and the appended claims.

What is claimed is:

1. A method for penetrating a well casing and surrounding earth strata at a desired elevation within a well, comprising the steps of:
    a) forming a hole through said well casing at the desired elevation;
    b) inserting a flexible tube having a nozzle on an end thereof into said hole; and
    c) pumping a fluid into and through the flexible tube and out through the nozzle while rotating said nozzle for drilling an extension of said hole into said earth strata, wherein in conjunction with the drilling of the extension of said Hole air or gas under pressure is injected into the well casing at a location in the vicinity of said hole for removing liquid from the well casing to reduce the hydrostatic head above said hole.

2. The method of claim 1, wherein the fluid is pumped into the flexible tube under a pressure of at least about 1,000 psi.

3. The method of claim 2, wherein the fluid is pumped into the flexible tube under a pressure of from between about 4,000 and about 10,000 psi.

4. The method of claim 1, wherein the hole in said well casing is cut using a rotating cutter on an end of a flexible shaft comprising at least one universal joint.

5. The method of claim 4, wherein structure is provided in association with the cutter for preventing advancement of the cutter substantially past the well casing.

6. The method of claim 1, wherein at least once during the drilling operation air or gas under pressure is injected through the nozzle.

7. The method of claim 6, wherein the pressure is sufficient to remove cuttings from said extension.

8. The method of claim 1, wherein after the extension has been drilled acid, a mixture of acid and another substance, or a gas is injected into the extension through the nozzle.

9. The method of claim 8, wherein a hydrostatic head is maintained in said well casing above said hole for producing a pressurized condition therein when the acid, the mixture of acid and another substance, or the gas under pressure is injected through the nozzle into the extension for absorption into the strata.

10. The method of claim 9, wherein the acid, the mixture of acid and another substance, or the gas is under a pressure substantially greater than the pressurized condition to facilitate the absorption.

11. The method of claim 9, wherein after a desired time period after the acid or gas is injected into the extension, the hydrostatic head is removed to allow contents of the well casing and the extension to flow upwardly through the well casing to a location where the contents can be examined.

12. Apparatus adapted for drilling into strata surrounding a well casing through an existing hole in a side of the well casing, comprising:
    a flexible tube adapted for passage through the hole having a first end, an opposite second end, and an internal cavity extending therethrough between the first end and the second end;
    a nozzle adapted for passage through the hole in the side of the well casing on the first end of the flexible tube, the nozzle having at least one aperture therethrough in communication with the internal cavity of the flexible tube;
    structure for supporting the tube in the well casing;
    an element including a tube having one end connected with a source of air or gas under pressure and an opposite end positionable in the well casing at a location adjacent the hole for discharging air or gas under pressure into the well casing for reducing a hydrostatic head in the well casing above the hole;
    structure for rotating at least the nozzle; and
    structure for communicating fluid under pressure to the second end of the flexible tube for passage through the tube and discharge through the nozzle during rotation thereof.

13. Apparatus of claim 12, wherein the structure for rotating the nozzle includes a hydraulic motor connected to the first end of the flexible tube and operable for rotating the tube and the nozzle.

14. Apparatus of claim 13, wherein the structure for rotating the nozzle further comprises a source of pressurized fluid connected through a tube to the motor for operating the motor.

15. Apparatus of claim 13, wherein the motor is located within the well casing in the vicinity of the hole and is connected by a tube to a source of pressurized fluid located on the ealth's surface.

16. A method for penetrating a well casing and surrounding earth strata at a desired elevation within a well, comprising the steps of:
    a) forming a hole through said well casing at the desired elevation;
    b) inserting a flexible tube having a nozzle on an end thereof into said hole;
    c) pumping a fluid into and through the flexible tube and out through the nozzle while rotating said nozzle for drilling an extension of said hole into said earth strata, and then,
    d) injecting acid, a mixture of acid and another substance, or a gas into the extension through the nozzle while a hydrostatic head is maintained in said well casing above said hole for producing a pressurized condition therein.

17. The method of claim 16, wherein the acid, the mixture of acid and another substance, or the gas is under a pressure substantially greater than the pressurized condition to facilitate the absorption.

18. The method of claim 16, wherein after a desired time period after the acid or gas is injected into the extension, the hydrostatic head is removed to allow contents of the well casing and the extension to flow upwardly through the well casing to a location where the contents can be examined.

19. Apparatus adapted for drilling into strata surrounding a well casing through an existing hole in a side of the well casing, comprising:

- a flexible tube adapted for passage through the hole having a first end, an opposite second end, and an internal cavity extending therethrough between the first end and the second end;
- a nozzle adapted for passage through the hole in the side of the well casing on the first end of the flexible tube, the nozzle having at least one aperture therethrough in communication with the internal cavity of the flexible tube;
- structure for supporting the tube in the well casing;
- structure for rotating at least the nozzle;
- structure for communicating fluid under pressure to the second end of the flexible tube for passage through the tube and discharge through the nozzle during rotation thereof; and
- an element operable for reducing a hydrostatic head in the well casing above the hole, including a tube having one end connected with a source of air or gas under pressure and an opposite end positionable in the well casing at a location adjacent the hole for discharging the air or gas under pressure into the well casing at the location.

20. A method for penetrating earth strata surrounding a well casing at a desired elevation within the well, comprising the steps of:

a) inserting a flexible tube through an existing hole through a side of said well casing at the desired elevation, the flexible tube having a nozzle on an end thereof; and b) pumping a fluid into and through the flexible tube and out through the nozzle while rotating said nozzle for drilling an extension of said hole into said earth strata and pumping air or gas under pressure into the well casing to reduce any hydrostatic head that exists in the well casing above said hole.

* * * * *